(12) United States Patent
Boulekos et al.

(10) Patent No.: US 8,706,373 B2
(45) Date of Patent: Apr. 22, 2014

(54) ACCELERATION ADJUSTER FOR VEHICLES WITH AN ELECTRONIC ACCELERATOR

(76) Inventors: Stamatios Boulekos, Athens (GR); Dimitrios Panagopoulos, Giannitsa Pellas (GR)

( * ) Notice: Subject to any disclaimer, the term of this patent is extended or adjusted under 35 U.S.C. 154(b) by 0 days.

(21) Appl. No.: 13/418,946

(22) Filed: Mar. 13, 2012

(65) Prior Publication Data

US 2012/0173110 A1 Jul. 5, 2012

Related U.S. Application Data

(63) Continuation of application No. 12/094,824, filed as application No. PCT/GR2006/000065 on Nov. 28, 2006, now abandoned.

(30) Foreign Application Priority Data

Dec. 9, 2005 (GR) .................................. 050100600

(51) Int. Cl.
*G06F 17/00* (2006.01)

(52) U.S. Cl.
USPC .................... 701/70; 701/53; 701/54; 701/99; 701/93; 74/512; 74/513; 74/514

(58) Field of Classification Search
USPC .......... 701/1, 42, 70, 53, 54, 99, 93; 123/361, 123/396, 399; 74/512, 513, 514; 180/117; 73/1.75
See application file for complete search history.

(56) References Cited

U.S. PATENT DOCUMENTS

| | | | | |
|---|---|---|---|---|
| 4,556,038 | A | * | 12/1985 | Okamoto et al. ............. 123/564 |
| 4,597,049 | A | * | 6/1986 | Murakami ................... 701/110 |
| 4,718,380 | A | * | 1/1988 | Katayose et al. ............. 123/399 |
| 4,920,939 | A | * | 5/1990 | Gale ............................ 123/399 |
| 4,972,816 | A | * | 11/1990 | Mausner ...................... 123/399 |
| 5,003,948 | A | * | 4/1991 | Churchill et al. ............. 123/352 |
| 5,189,621 | A | * | 2/1993 | Onari et al. .................. 701/102 |
| 5,307,776 | A | * | 5/1994 | Unuvar et al. ................ 123/399 |
| 5,320,076 | A | * | 6/1994 | Reppich et al. .............. 123/399 |
| 5,602,732 | A | * | 2/1997 | Nichols et al. ............... 702/185 |
| 5,625,558 | A | * | 4/1997 | Togai et al. .................... 701/93 |
| 5,823,164 | A | * | 10/1998 | Seki et al. .................... 123/396 |
| 6,102,002 | A | * | 8/2000 | Gimmler et al. ............. 123/399 |
| 6,116,214 | A | * | 9/2000 | Ishida .......................... 123/399 |
| 6,915,778 | B2 | * | 7/2005 | Clemence et al. ........... 123/361 |
| 7,239,235 | B2 | * | 7/2007 | Yates ........................... 340/507 |

(Continued)

*Primary Examiner* — Thomas Black
*Assistant Examiner* — Sara Lewandroski
(74) *Attorney, Agent, or Firm* — Larry E. Henneman, Jr.; Gregory P. Gibson; Henneman & Associates, PLC

(57) ABSTRACT

An aftermarket amplifier of acceleration signal (FIG. 2, box A), which is mounted between the potentiometer of the acceleration pedal (FIG. 2, box B) and the electronic control unit (FIG. 2, box C) and is programmed to control and to modify the signals from the accelerator pedal. The amplifier improves the acceleration of a car and overcomes the problems occurring during overreacting. The amplifier measures the signals from the acceleration pedal, calculates the change of the angle of the potentiometer of acceleration speed (angular speed) and multiplies the signals from the acceleration pedal by a value which is determined by the angular speed of the potentiometer of the accelerator pedal. Additionally, the amplifier includes a function of a cruise control, which can be controlled with a single control switch (FIG. 2, box F).

32 Claims, 2 Drawing Sheets

(56) References Cited

U.S. PATENT DOCUMENTS

| | | | |
|---|---|---|---|
| 2001/0029414 A1* | 10/2001 | Nada | 701/34 |
| 2005/0056253 A1* | 3/2005 | Yone et al. | 123/399 |
| 2005/0216134 A1* | 9/2005 | Katrak et al. | 701/1 |
| 2006/0106512 A1* | 5/2006 | Funcke et al. | 701/34 |

* cited by examiner

ACCELERATION ADJUSTER FOR VEHICLES WITH AN ELECTRONIC ACCELERATOR

RELATED APPLICATIONS

This application is a continuation of co-pending U.S. patent application Ser. No. 12/094,824, filed Nov. 17, 2008 by the same inventors, which is a 35 U.S.C. §371 application of International Application No. PCT/GR06/00065, filed Nov. 28, 2006 now abandoned by the same inventors and published in English, and claims priority to Greek Application No. GR 20050100600, filed by the same inventors in Greece on Dec. 9, 2005. Each of the above-referenced applications is incorporated by reference herein in its entirety.

BACKGROUND OF INVENTION

1. Field of the Invention

The invention refers to a system of continuous measurements and transformations of signals which come from the potentiometer of an electronic acceleration pedal of a modern car.

2. Background

Lately there has been an increase in the complaints of drivers of new technology cars having an electronic acceleration pedal concerning the lack of acceleration response to the driver's orders.

In new technology cars, the command of acceleration is not transmitted with the traditional wire (the mechanical way). Instead, the command is transmitted from the driver's foot to the electronic control unit (ECU) with a potentiometer (electronic acceleration pedal).

The application of the electronic acceleration pedal has resulted in bad acceleration of the car and the problems caused in the overacting and generally the circulation of vehicles.

SUMMARY OF THE INVENTION

This invention is designed to cover the disadvantage of poor acceleration of cars that have an electronic acceleration pedal.

The basic operation of the amplifier of acceleration signals for new technology cars is the digital transformation of the signals of the potentiometer with proper software and their transmission to the control unit.

Simultaneously with the transformation of acceleration signals, the device also executes a second operation, which is to maintain a steady speed when a switch is pressed by the driver (automatic pilot).

The amplifier of acceleration signals for new technology cars has as a basic item a microprocessor which is programmed to measures the signals from the acceleration potentiometer, and supply the ECU with new signals which will improve the acceleration of the vehicle and will keep the speed of the vehicle steady during long travels, when it is chosen by the driver.

The invention is fully applied as it refers to changing of the signals of the electronic acceleration pedal, and it does not alter the structure of the central program of the car.

One more advantage of the device is the possibility of it's inactivation by pressing a switch on the car board. (Grounding command).

BRIEF DESCRIPTION OF THE DRAWINGS

The invention is presented below with reference to the drawings.

DETAILED DESCRIPTION

The signals from the acceleration potentiometer (FIG. 2, box B) are smoothed and directed to the A/D input of the microprocessor. As will be described below, the microprocessor provides a means for determining a rate of change in position of the electronic accelerator. The microprocessor also provides a means for generating output signals by multiplying the input signals by an amount that is functionally dependent on the rate of change in position of the electronic accelerator.

The microprocessor (FIG. 2, box A) is programmed to measure the signals from the acceleration pedal with priorities, and to calculate the change of the angle of the potentiometer of the acceleration pedal (the angular speed). Then the program multiplies the signal's rates by an algorithm which is determined by the rate of the angular speed of the acceleration potentiometer.

The signals at the entry of the microprocessor are compared between each other as well as the altered signals at the exit of the microprocessor. Another algorithm oversees the comparisons of the signals and decides whether the entry signals and their transformations should be accepted before being sent to the exit the device.

As long as the device is interfaced between the acceleration potentiometer (FIG. 2, box B) and the ECU (FIG. 2, box C) it is possible for the device to undertake complete control of the car's speed as it is asked for by the driver.

When the car develops some speed, e.g. 80 km/hour, then if the driver presses the auto-pilot switch (FIG. 2, box F), the program reads the command and waits for the driver to leave the acceleration pedal within the next five seconds. (Confirmation of auto pilot order).

If the program recognizes these two conditions (switch and pedal), then it will enable the operation of the automatic pilot.

Now the microprocessor does not alter the signals of the electronic acceleration pedal, but it reads the RPM of the engine and increases or decreases the commands to the ECU with final result to keep the RPM of the engine steady as well as the speed of the car, without the driver having to press the acceleration pedal.

The pulses from the injectors (FIG. 2, box D) are used for the calculation of the engine revolving speed (RPM) during the operation of the automatic pilot.

Figure 1A:
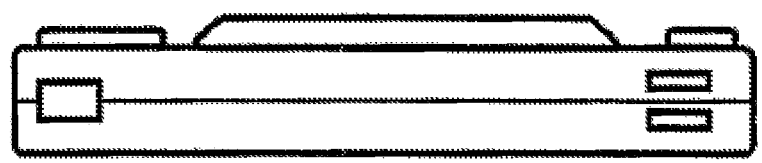
FIG. 1A is a side view showing the outer appearance and exterior dimensions of a device according to one embodiment of the present invention.
Figure 1B:
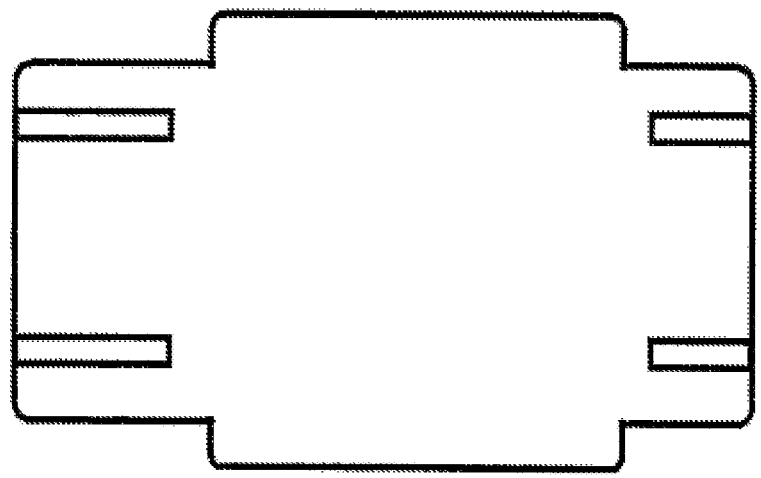
FIG. 1B is a top view of the device of FIG. 1A.
Figure 2:
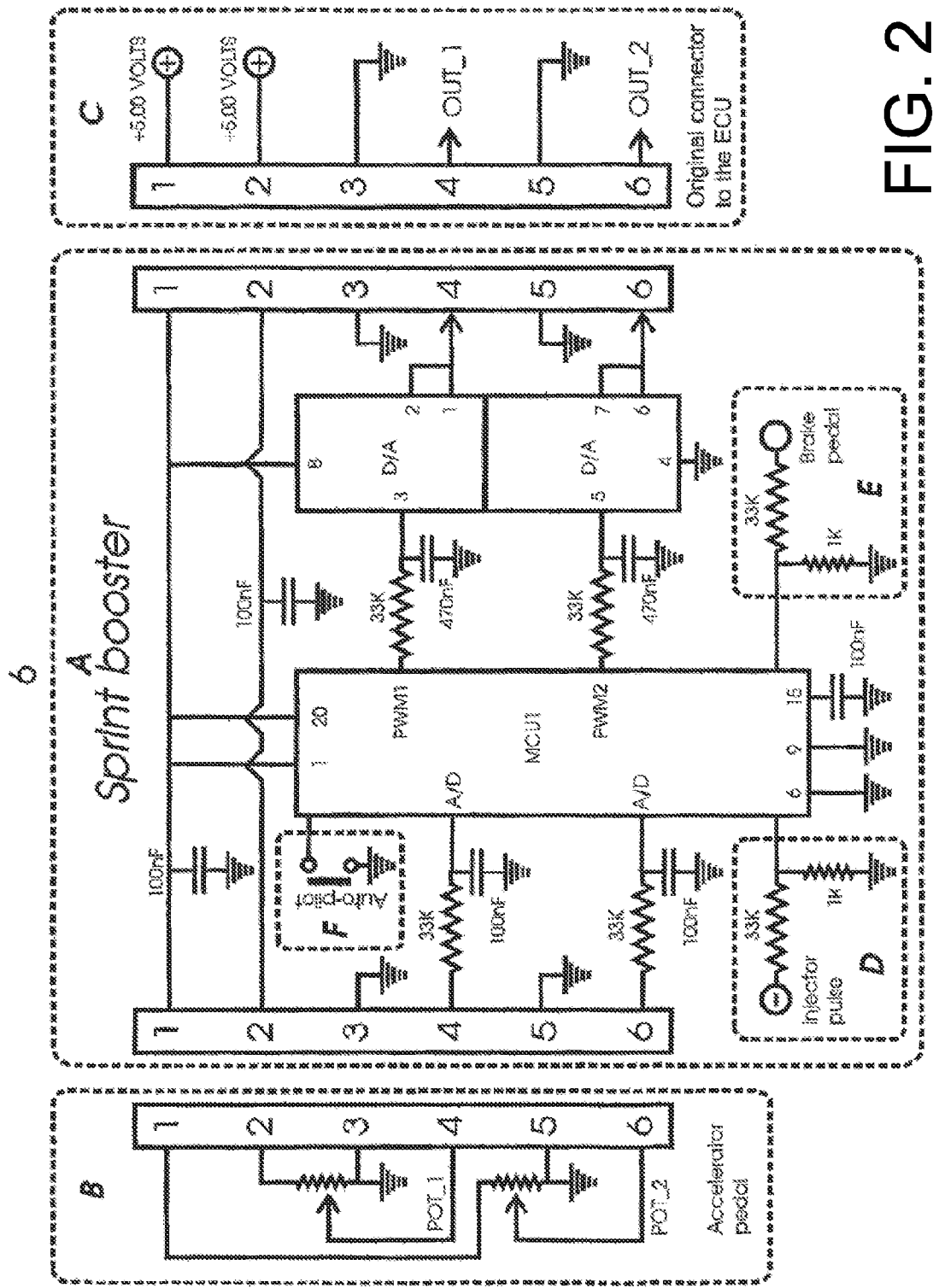
FIG. 2 is a diagram showing one embodiment of the electronic circuit of the amplifier of acceleration signals-auto pilot, for new technology cars according to the present invention.

In order to take the program out of auto pilot operation, one of the following should be done: the driver should either press the brake pedal (FIG. 2, box E) or press the acceleration pedal again (FIG. 2, box B).

The amplifier of acceleration signals and auto pilot (FIG. 2, box A) is attached between the potentiometer of the acceleration pedal (FIG. 2, box B) and the ECU (FIG. 2, box C).

The system is completed in a device which is placed in the interior of the car and is attached to the connector of the acceleration pedal.

The designing of the device allows its easy installation in all models in a simple way, without needing to get into the electronic circuits of the car. (Is not influenced the operation of circuits of the car, e.g., injection system-ignition system, ABS etc.).

We claim:

1. A retrofit device for a vehicle with an electronic accelerator and an electronic control unit, said retrofit device for improving the acceleration of said vehicle, said retrofit device comprising:
   a first connector configured to be connected to said electronic accelerator and configured to accept input signals from said electronic accelerator, said input signals indicating a position of said electronic accelerator;
   a second connector configured to be connected to said electronic control unit and configured to provide output signals to said electronic control unit, said output signals indicating a transformed position of said electronic accelerator;
   circuitry electrically coupled to said first and second connectors, said circuitry configured
      to receive said input signals,
      to send said output signals,
      to calculate a rate of change in position of said electronic accelerator based on said input signals, and
      to generate said output signals by multiplying said input signals by said rate of change in position of said electronic accelerator; and wherein
   said retrofit device is configured to be installed in said vehicle by connecting said first connector to said electronic accelerator and connecting said second connector to said electronic control unit.

2. The retrofit device of claim 1, wherein:
   said input signals comprise a first input signal and a second input signal; and
   said circuitry is further configured to compare said first and second input signals with each other.

3. The retrofit device of claim 2, wherein said circuitry is further configured to decide based on said comparison whether said input signals should be accepted before being sent to said electronic control unit.

4. The retrofit device of claim 1, wherein:
   said output signals comprise a first output signal and a second output signal; and
   said circuitry is further configured to compare said first and second output signals with each other.

5. The retrofit device of claim 4, wherein said circuitry is further configured to decide based on said comparison whether the output signals should be accepted before being sent to said electronic control unit.

6. The retrofit device of claim 1, wherein:
   said input signals comprise a first input signal and a second input signal;
   said output signals comprise a first output signal and a second output signal; and
   said circuitry is further configured
      to perform a first comparison on said first and second input signals with each other,
      to perform a second comparison on said first and second output signals with each other, and
      to decide, based on said first and second comparisons, whether said input signals and said output signals should be accepted before being sent to said electronic control unit.

7. The retrofit device of claim 1, further comprising a switch for setting said retrofit device inactive.

8. The retrofit device of claim 1, wherein:
   said input signals comprise a first input signal and a second input signal; and
   said circuitry is configured to process said first and second independently from each other.

9. The retrofit device of claim 1, wherein said circuitry is further configured to smooth said input signals.

10. The retrofit device of claim 1, wherein said electronic accelerator includes an accelerator pedal.

11. The retrofit device of claim 1, wherein:
   said input signals indicate an actual angle of said electronic accelerator;
   said output signals indicate a transformed angle of said electronic accelerator; and
   said circuitry is configured to
      calculate an angular speed of said electronic accelerator based on said input signals, and
      generate said output signals by multiplying said input signals by an amount that is functionally dependent on said angular speed.

12. The retrofit device of claim 1, further comprising a housing enclosing said circuitry.

13. The retrofit device of claim 1, wherein said retrofit device is configured to be installed in said vehicle without modifying said electronic control unit.

14. The retrofit device of claim 1, wherein said vehicle is a car.

15. A vehicle having an electronic accelerator with a first connector, an electronic control unit with a second connector, and an acceleration adjuster, said acceleration adjuster comprising:
   a third connector complementary to said first connector, said third connector configured to accept input signals from said electronic accelerator, said input signals indicating an actual position of said electronic accelerator;
   a fourth connector complementary to said second connector, said fourth connector configured to provide output signals to said electronic control unit, said output signals indicating a transformed position of said electronic accelerator; and
   circuitry electrically coupled to said third connector and said fourth connector, said circuitry configured
      to receive said input signals from said third connector,
      to provide said output signals to said fourth connector,
      to calculate a rate of change in position of said electronic accelerator based on said input signals, and
      to generate said output signals by multiplying said input signals by said rate of change in position of said electronic accelerator; and wherein
   said first connector is connected to said third connector;
   said second connector is connected to said fourth connector; and
   said second connector is complementary to and adapted to engage said first connector.

16. The vehicle of claim 15, wherein:
   said input signals comprise a first input signal and a second input signal; and
   said circuitry is further configured to compare said first and second input signals with each other.

17. The vehicle of claim 16, wherein said circuitry is further configured to decide based on said comparison whether said input signals should be accepted before being sent to said electronic control unit.

18. The vehicle of claim 15, wherein:
   said output signals comprise a first output signal and a second output signal; and
   said circuitry is further configured to compare said first and second output signals with each other.

19. The vehicle of claim 18, wherein said circuitry is further configured to decide based on said comparison whether the output signals should be accepted before being sent to said electronic control unit.

20. The vehicle of claim 15, wherein:
said input signals comprise a first input signal and a second input signal;
said output signals comprise a first output signal and a second output signal; and
said circuitry is further configured
to perform a first comparison on said first and second input signals with each other,
to perform a second comparison on said first and second output signals with each other, and
to decide, based on said first and second comparisons, whether said input signals and said output signals should be accepted before being sent to said electronic control unit.

21. The vehicle of claim 15, further comprising a switch for deactivating said acceleration adjuster.

22. The vehicle of claim 15, wherein:
said input signals comprise a first input signal and a second input signal; and
said circuitry is configured to process said first and second signals independently from each other.

23. The vehicle of claim 15, wherein said circuitry is further configured to smooth said input signals.

24. The vehicle of claim 15, wherein said electronic accelerator includes an accelerator pedal.

25. The vehicle of claim 15, wherein:
said input signals indicate an actual angle of said electronic accelerator;
said output signals indicate a transformed angle of said electronic accelerator; and
said circuitry is configured to
calculate an angular speed of said electronic accelerator based on said input signals, and
generate said output signals by multiplying said input signals by an amount that is functionally dependent on said angular speed.

26. The vehicle of claim 15, further comprising a housing enclosing said circuitry.

27. The vehicle of claim 15, wherein said acceleration adjuster is configured to be installed in said vehicle without modifying said electronic control unit.

28. The vehicle of claim 15, wherein said vehicle is a car.

29. A retrofit device for a vehicle with an electronic accelerator and an electronic control unit, said retrofit device for improving the acceleration of said vehicle, said retrofit device comprising:
a first connector configured to be connected to said electronic accelerator and configured to accept input signals from said electronic accelerator, said input signals indicating an actual position of said electronic accelerator;
a second connector configured to be connected to said electronic control unit and configured to provide output signals to said electronic control unit, said output signals indicating a transformed position of said electronic accelerator;
means for determining a rate of change in position of said electronic accelerator; and
means for generating said output signals by multiplying said input signals by an amount that is functionally dependent on said rate of change in position of said electronic accelerator.

30. The retrofit device of claim 1, wherein said amount that is functionally dependent on said rate of change in position of said electronic accelerator is functionally independent of said position of said electronic accelerator.

31. The vehicle of claim 15, wherein said amount that is functionally dependent on said rate of change in position of said electronic accelerator is functionally independent of said position of said electronic accelerator.

32. The retrofit device of claim 29, wherein said amount that is functionally dependent on said rate of change in position of said electronic accelerator is functionally independent of said position of said electronic accelerator.

* * * * *